United States Patent

[11] 3,522,831

[72] Inventors: Luigi Torti
 Monza, Italy;
 Stefano Marcello, Ferrara, Italy
[21] Application No.: 718,339
[22] Filed: April 3, 1968
[45] Patented: Aug. 4, 1970
 Continuation-in-part of Ser. No. 417,775, Dec. 11, 1964.
[73] Assignee: Montecatini Edison S.p.A.
 Milan, Italy
 a Corp. of Italy
[32] Priority: Dec. 13, 1963
[33] Italy
[31] No. 25716/63

[54] METHOD OF BONDING DIENE RUBBER TO ETHYLENE/PROPYLENE OR ETHYLENE/PROPYLENE/DIENE ELASTOMER
7 Claims, No Drawings

[52] U.S. Cl. .................................................... 152/330,
 156/128, 156/334, 161/242, 161/252, 161/253,
 260/41.5, 260/79.5, 260/80.78
[51] Int. Cl. .................................................... B29h 8/00,
 B60c 1/00, C08c 11/00
[50] Field of Search ........................................ 417/775;
 156/128, 334; 161/242, 252, 253; 260/41.5, 79.5,
 80.78; 152/330

[56] References Cited
UNITED STATES PATENTS

| | | | |
|---|---|---|---|
| 3,136,739 | 6/1964 | Adamek, et al............... | 260/455 |
| 3,262,482 | 7/1966 | Clifton, et al................. | 152/330 |
| 3,294,766 | 12/1966 | Henderson, et al............ | 260/80.5 |
| 3,296,061 | 1/1967 | Tavenor, et al................ | 161/240 |
| 3,311,151 | 3/1967 | Willis, et al............ | 152/330, 362, 624 |
| 3,331,793 | 7/1967 | Souffie .......................... | 260/4 |
| 3,406,732 | 10/1968 | Milano .......................... | 152/330 |

Primary Examiner— John T. Goolkasian
Assistant Examiner— C. B. Cosby
Attorney—Hubbell, Cohen and Stiefel ABSTRACT: Covulcanization process useful in the manufacture or retreading of tires. A first layer of a natural or synthetic diene rubber containing a mineral reinforcing filler, and sulfur and accelerator, is bonded to a second elastomer layer of an ethylene/alpha-olefin copolymer or ethylene/alpha-olefin/diene terpolymer having an ML (1+4) at 100°C of at least 60, optionally containing plasticizer to decrease the ML to a workable value, and containing an organic peroxide and sulfur, by contacting the two layers and heating to effect vulcanization.

U.S. PATENT 3,522,831
METHOD OF BONDING DIENE RUBBER TO ETHYLENE/PROPYLENE OR ETHYLENE/PROPYLENE/DIENE ELASTOMER

CROSS-REFERENCES TO COPENDING APPLICATIONS

This is a continuation-in-part of our copending application, Ser. No. 417,775, filed Dec. 11, 1964, now abandoned.

BACKGROUND OF THE INVENTION

Field of the Invention

This invention is directed to a process for bonding a natural or synthetic diene rubber and an elastomer which is an ethylene/propylene or an ethylene/propylene/diene polymer. The present invention is particularly useful in tire manufacturing and retreading.

DESCRIPTION OF THE PRIOR ART

It is known that natural rubber, the first among the elastomeric products to be used for the manufacture of tires, has excellent general characteristics and more particularly the lowest elastic hysteresis among commercial rubbers. However, this rubber has a low abrasion resistance (which may however be improved somewhat by using suitable fillers) and a low resistance to ageing (due to the attack of ozone).

Various attempts have been made to partially or completely replace natural rubber with synthetic rubbers which have better characteristics than SBR rubber and butyl rubber.

Recently, elastomers having a high degree of saturation, and therefore a particularly high resistance to oxidation, have been prepared. They comprise copolymers of ethylene with propylene or 1-butene, obtained by copolymerizing mixtures of the relative, monomers in the presence of catalytic systems prepared by the reaction of a transition metal compound, e.g., vanadium compounds, with organometallic compounds, e.g., aluminum trialkyls and aluminum alkyl halides.

It is known that these ethylene/alpha-olefin copolymers can be vulcanized by using peroxidic compounds which act as generators of free radicals, in the presence of an acceptor, such as sulfur, at temperatures between 140° and 180°C.

These copolymers and the vulcanized products obtained therefrom have very good mechanical properties, excellent resistance to abrasion and ageing, and relatively low elastic hysteresis, though higher than that of natural rubber. These characteristics make these copolymers most suitable for the production of tire treads where they show better performance than those of commercial rubbers. These copolymers may also be used for the manufacture of complete tires. Natural rubber or synthetic rubber having a low hysteresis, however, is preferably used for the tire sections which are subjected to flexure stresses, namely the sides and the carcass.

Elastomers which have a low unsaturation content are also known. These comprise products obtained by statistical copolymerization of ethylene with propylene and smaller amounts of nonconjugated dienes, i.e., linear dienes such as 2-methyl-1,4-pentadiene,11-ethyl-1,11-tridecadiene, 6-methyl-1,5-heptadiene, 1,6-heptadiene, etc., and nonconjugated cyclic dienes, such as bicyclo [2.2.1] hepta-2,5-diene, dicyclopentadiene, vinylcyclohexene, 1,5-cyclo-octadiene, norbornadiene, methylenenorbornene, 6-methyl-4,7,8,9-tetrahydroindene, 5,6-dimethyl-4,7,8,9-tetrahydroindene, 6-ethylidenenorbornene, etc.

These terpolymers can be obtained with the same catalytic systems used for the production of the copolymers. The macromolecules contain double bonds distributed at random in the side groups. This allows vulcanization with sulfur and ultra-accelerants of the type used for butyl rubber. These terpolymers can also be vulcanized, by the same agents as the copolymers, i.e., organic peroxides and co-agents such as sulfur. The vulcanized products obtained from these terpolymers possess very good mechanical, elastic and electrical properties and an exceptional resistance to oxidation and to chemical agents. Thus they are suitable for many applications both of common rubbers and of special rubbers, more particularly for the manufacture or retreading of tires.

A tire comprising a carcass made of natural rubber and a tread made of an ethylene/alpha-olefin or an ethylene/alpha-olefin/nonconjugated diene elastomer is a very good combination, since the most desirable characteristics of each polymer are combined in a single product. However, the manufacture or retreading of such tires is very difficult because natural rubber is not compatible with the aforementioned types of elastomer, and therefore it has not been possible to obtain direct adhesion of layers of the two incompatible rubbers during covulcanization.

It is known that, although natural rubber can be vulcanized with organic peroxides, adjacent layers of natural rubber and copolymer or terpolymer, both layers containing organic peroxide, do not have sufficient adhesion after vulcanization. The same result is obtained when natural rubber and ethylene/propylene/nonconjugated diene layers both contain vulcanizing systems including sulfur.

A previous method of overcoming this problem consisted of interposing between the two layers a third layer consisting of a chlorosulfonated ethylene/alpha-olefin copolymer, physically and chemically compatible with the two rubbers and with the respective vulcanizing systems. This method makes it possible to obtain the desired result, but presents other complications and higher costs.

Another previous method for obtaining adhesion between the layer of natural rubber and the layer of copolymer comprised the use of a particular vulcanization recipe enriched with peroxide and sulfur at vulcanization temperatures higher than 170°C.

Such a high temperature, however, cannot always be reached with the apparatus used in the rubber industry. Moreover, the use of larger amounts of peroxide and sulfur cause an increase in the offensive smell. Thus, to avoid this, it was necessary to reduce the mixture to a thin sheet with a modified vulcanization recipe, onto which a third layer of copolymer with an unmodified recipe was placed. The inconveniences of an interlayer are therefore present with this method also.

SUMMARY OF THE INVENTION

It has now been found, in accordance with this invention, that by using a copolymer or a terpolymer of ethylene and propylene or 1-butene having a Mooney viscosity ML (1+4) at 100° C. of at least 60 it is possible, without any particular precautions, to obtain perfect compatibility of adhesion between a natural rubber layer containing a mineral reinforcing filler and vulcanizing agents comprising sulfur and accelerators, and a layer of the elastomeric copolymer or terpolymer containing an organic peroxide and sulfur as the vulcanizing agents.

More particularly, we utilize a layer (A) of natural or synthetic diene rubber containing a mineral reinforcing filler and vulcanizing agents comprising sulfur and accelerators. To this layer (A), we apply a layer (B) of saturated ethylene/alpha-olefin copolymer or a low unsaturation ethylene/propylene/nonconjugated diene terpolymer, such copolymer or terpolymer having a Mooney viscosity ML (1+4) at 100° C. of at least 60, this layer (B) containing an organic peroxide and sulfur as vulcanizing agents. These layers are covulcanized by heating, and are thereby bonded together.

Adhesion values of the bonding obtained by our method are very high. Thus, when measured by peeling tests according to ASTM D 413/39, we obtained satisfactory values, namely, values which are higher than 10-12 kg/cm at 90° C.

The process of this invention gives particularly advantageous results using either a natural rubber or a synthetic diene rubber inlayer (A). Suitable synthetic diene rubbers include, for example, rubbery styrene/butadiene copolymers, poly (1,4-cis-butadiene), poly (1,4-cis-isoprene), butyl rubber, nitrile rubber, etc. However, natural rubber is preferred for certain uses, especially in tires, for the reasons mentioned above.

We have also found that good adhesion values are obtained even if the elastomeric copolymer or terpolymer having a high Mooney viscosity is plasticized as by extending with paraffinic oils, to decrease its viscosity and workability to desired values. Thus, for example, when an unplasticized, unvulcanized copolymer having a Mooney viscosity of 80 is plasticized with 30 parts per hundred of paraffinic oil, the thus extended mix has a final, decreased Mooney viscosity of ML 25. Such a plasticized mix may then, according to the present invention, be compounded with vulcanizing agents, applied as a layer (B) to a rubber layer (A), and then covulcanized. We have found that the adhesion values of bonds produced by such a process are much higher than the corresponding values obtained when a nonextended copolymer having the same viscosity, namely, ML 25, is compounded and covulcanized under identical conditions. Example 7 hereinbelow presents the results of tests in which varying amounts of plasticizer were incorporated in elastomers of varying Mooney Viscosity.

The excellent bonding obtained by using high Mooney viscosity elastomers is most surprising and unexpected, inasmuch as it is customary to avoid such polymers because of their poor workability in standard apparatus, e.g., roll mixers, mixers, and extruders.

Moreover, experience has taught that by using copolymers or terpolymers obtained in such a way as to be sufficiently or easily workable, it was not possible to obtain acceptable adhesion values with natural rubbers and the other dienic rubbers, and immediate separation took place, especially at higher temperatures.

The results of the direct adhesion method of the present invention are particularly surprising and unexpected in the case of low-unsaturation elastomeric terpolymers of ethylene, propylene and a nonconjugated diene, since it was known that, like butyl rubber, such terpolymers can hardly be covulcanized with natural rubber.

Moreover, it could not be foreseen that an elastomer having a high Mooney viscosity, i.e., at least 60, would retain its excellent bonding properties even when extended with paraffinic oils to a lower Mooney viscosity, which is more suitable for working. Yet we have found that this adhesion of the plasticized elastomer having a decreased Mooney viscosity, is much greater than that of a corresponding nonplasticized elastomer with the same low Mooney viscosity as that of the plasticized elastomer.

DESCRIPTION OF THE PREFERRED EMBODIMENTS

The mineral fillers used for reinforcing the layer (A) of natural or synthetic diene rubber include anhydrous and hydrated silica. Particularly good adhesion values are obtained with a mixture containing 20 to 100 parts by weight of white mineral filler per 100 parts of natural rubber.

If the natural rubber mixture contains a black reinforcing filler, e.g., carbon black of the furnace channel, thermal type, etc., the values of adhesion are clearly lower. In the absence of any filler in the layer of natural rubber, no adhesion to the copolymer or terpolymer layer is obtained. The process of adhesion of the two layers of rubbers according to the present invention is of a particular interest due to the exceptional values of adhesion at higher temperatures as shown by the vulcanizates. It should be added that in the case of the well known synthetic rubbers it has not been possible to obtain good adhesion to natural rubber. The peeling method gave values at 90° C. higher than 14–15 kg./cm. for SB-R rubber (butadiene-styrene copolymer) and 8–10 kg./cm. for brominated butyl rubber (isobutylene-isoprene copolymer).

The copolymers that can be used according to the present invention are preferably the copolymers of ethylene with alpha-olefins, more particularly with propylene and/or 1-butene, having an ethylene molar content between 20 and 80%, more preferably from 40 to 65%, and a Mooney viscosity ML (1+4) at 100° C. of at least 60, most preferably between 60 and 100 ML.

The terpolymers comprising ethylene and propylene, which can be used according to the invention, contain as the third comonomer a nonconjugated linear or cyclic diene, more particularly dicyclopentadiene, 1,5-cyclooctadiene or 6-methyl-4,7,8,9-tetrahydroindene, in such amount that 0.05 to 1 double bonds are present per 100 carbon atoms. The ethylene molar content ranges between 20 and 80%, and the terpolymer must have a Mooney viscosity ML (1+4) at 100° C. of at least 60.

The mixes of copolymer and terpolymer in general contain a reinforcing filler in amounts from 5 to 200 parts, and preferably between 20 and 100 parts, per 100 parts of copolymer or terpolymer.

The vulcanizing agents used in the mixes of copolymer or terpolymer include the organic peroxides in amounts between 0.1 and 10 parts by weight per 100 parts of copolymer or terpolymer, and sulfur in amounts lower than 50% of the peroxide. If, in the mix of terpolymer, vulcanizing agents comprising sulfur and accelerators are used (the other operating conditions being kept uniform, the adhesion of the terpolymer to natural rubber does not reach satisfactory values. The vulcanization temperature may range between about 110°C and 200°C and is preferably between about 140°C and 180°C.

The following examples illustrate the invention. Although only ethylene/propylene copolymers and ethylene/propylene/1,5-cyclooctadiene, respectively ethylene/propylene/6-methyl-4,7,8,9-tetrahydroindene terpolymers are exemplified, analogous results have been obtained with ethylene/1-butene copolymers and with terpolymers of ethylene, propylene and nonconjugated dienes other than 1,5-cyclooctadiene or 6-methyl-4,7,8,9-tetrahydroindene; e.g., dicyclopentadiene, 1,5-hexadiene, 5,6-dimethyl-4,7,8,9-tetrahydroindene and the like.

The adhesion values reported in the following examples were determined according to the ASTM-D-413/39 Machine Method, called "peeling" method and are given in kg/cm. The preparation of the specimens for the determination of the adhesion values is as follows. The mixes to be attached are laminated in a roll mixer to obtain 3-mm thick sheets. Rectangles of 16 x 8 cm are then cut and their surfaces are treated with a solvent such as heptane, benzene, etc., and then overlapped. The molding and vulcanization are carried out in a press. In order to better carry out the peeling test, the outer surfaces of the specimens are reinforced by applying a square fabric onto them, before molding. From the vulcanized sheet, three specimens having a width of 2 cm are cut by a hollow punch.

EXAMPLE 1

Commercial tires were retreaded by replacing the natural rubber tread with a tread of ethylene/propylene copolymer having a Mooney viscosity ML (1+4) at 100°C of 60, extended with paraffinic oil (FL 65) in the proportion of 75% of copolymer and 25% of oil.

The adhesion of the tread of ethylene/propylene copolymer to the carcass of vulcanized natural rubber was obtained as follows.

Five tire carcasses were rasped and then wetted with heptane. A sixth rasped carcass was spread with a commercial adhesive made up of rubber, commonly used by the manufacturers of retreaded tires. A thin sheet of white natural rubber having the following composition was then spread on each carcass:

Mix A:  Parts by weight

| | |
|---|---|
| Masticated natural rubber (having a Mooney viscosity ML (1+4) at 100° C. of 40) | 100 |
| Antioxidant(phenyl-beta-naphthylamine) | 1 |
| Anhydrous silica (Aerosil) | 40 |
| ZnO | 5 |
| Diphenylguanidine | 0.5 |
| Santocure(cyclohexyl-benzothiazyl-sulphenamide) | 1.2 |
| Sulfur | 2.5 |

Onto this thin sheet a tread mix comprising ethylene/propylene copolymer was then applied. The tread mix had the following composition:

Mix B:  Parts by weight

| | |
|---|---|
| Ethylene/propylene copolymer (having a propylene molar content of 50% and a Mooney viscosity ML (1+4) at 100° C. of 60) | 75 |
| Oil FL 65 | 25 |
| Carbon black HAF | 50 |
| Sulfur | 0.6 |
| Alpha-alpha'-bis(tert.-butyl-peroxy) diisopropylbenzene (Peroximon) | 3.2 |

The tires thus assembled were vulcanized in a suitable mold at the temperature of 160°C for 50 minutes.

In accordance with the method of our invention, the Mix A constituted the "layer (A)" and the Mix B constituted the "layer (B)."

The tires thus retreaded and tested on a "road-wheel" at 60 km/hr with a load of 600 kg/axle, behaved like the corresponding commercial tires retreaded with treads of natural rubber.

The results of the tests were as follows: Three of the first five tires (heptane treated carasses) burst after 35 hours. The sixth tire (adhesive treated carcass) also burst after 35 hours. The other two tires burst after 30 and 32 hours, respctively.

In each case, the bursting resulted from the breaking of the natural rubber carcass. No detachment or loosening of the ethylene/propylene copolymer tread from the plies of the natural rubber carcass was detected at any time.

EXAMPLE 2

A tire was manufactured with a carcass of natural rubber (Mix C hereinbelow) and a tread of ethylene/propylene copolymer (ML(1+4) at 100°C=60 extended with a paraffinic oil in the proportions of 75% of copolymer and 25% of oil (Mix B of Example 1).

The adhesion between the carcass of natural rubber and the tread of ethylene propylene copolymer was obtained by means of a 1 mm thick sheet of white natural rubber having the composition of Mix A of Example 1.

In accordance with the method of our invention, the Mix A constituted the "layer (A)" and the Mix C constituted the "layer (B)".

This tire tested on the "road-wheel" at 60 km/hr under a load of 600 kg/axle did not show any detachment between natural rubber and ethylene/propylene copolymer.

The mix used for rubberizing the ply had the following composition:

Mix C:  Parts by weight

| | |
|---|---|
| Natural rubber (ML (1+4) 100° C.=40) | 100 |
| ZnO | 1 |
| Carbon black SRF | 25 |
| Phenyl-beta-naphthylamine | 1 |
| Stearic acid | 1 |
| Pine tar | 5 |
| Di-ortho-tolylguanidine | 0.75 |
| Santocure | 0.15 |
| Sulfur | 2.8 |

EXAMPLE 3 a) Two mixes, having the following compositions, were prepared:

Mix D:  Parts by weight

| | |
|---|---|
| Natural rubber (masticated at ML (1+4) 100° C.=40) | 100 |
| Antioxidant | 1 |
| Anhydrous silica (Aerosil) | 40 |
| ZnO | 5 |
| Diphenylguanidine | 0.5 |
| Santocure | 1.2 |
| Sulfur | 2.5 |

Mix E:  Parts by weight

| | |
|---|---|
| Ethylene/propylene copolymer (containing 45% by moles of propylene and having a Mooney viscosity ML (1+4) at 100° C.=60) | 100 |
| Carbon black HAF | 50 |
| Sulfur | 0.3 |
| Alpha-alpha'-bis(tert.-butyl-peroxy) diisopropylbenzene (Peroximon) | 1.6 |

In accordance with the method of our invention, the Mix D constituted the "layer (A)" and the Mix E constituted the "layer (B)".

The specimens were molded in a press at the temperature of 160°C for 50 minutes.

The peeling test of the specimens was carried out at 90°C. The result obtained was: 12 kg/cm.

b) For the sake of comparison the adhesion of Mix D to the following mix was measured:

Mix F:  Parts by weight

| | |
|---|---|
| Ethylene/propylene copolymer (containing 48% by moles of propylene and having a Mooney viscosity ML (1+4) at 100° C. of 20) | 100 |
| Carbon black HAF | 50 |
| Sulfur | 0.3 |
| Alpha-alpha'-bis(tert.-butyl-peroxy) diisopropylbenzene (Peroximon) | 1.6 |

The modalities of molding and of peeling were those defined under a).

The peeling test gave the following result at 90°C. 2 kg/cm.

The adhesion of Mix F made up of copolymer having a Mooney viscosity ML=20 is clearly lower than that of the preceding Mix E made up of copolymer having a Mooney viscosity ML=60.

EXAMPLE 4.

This example shows the influence of the Mooney viscosity at 100°C of the ethylene/propylene copolymer on the value of adhesion to natural rubber. Mix D of Example 3 is made to adhere to mixes of E type of Example 3 prepared with different copolymers in which the Mooney viscosity has the values reported in Table 1. The copolymers used had a propylene composition of between 45 and 55% by moles. The molding times and temperatures are the same as in Example 3.

TABLE.1.—UNPLASTICIZED ETHYLENE/PROPYLENE COPOLYMER, VARYING MOONEY VISCOSITY

| Mooney viscosity ML (1+4) at 100° C. of the ethylene/propylene copolymer substituted for the copolymer in Mix E: | Peeling at 90° C. (kg./cm.) |
|---|---|
| 13 | 2 |
| 28 | 3 |
| 36 | 5 |
| 40 | 8 |
| 45 | 8 |
| 53 | 9 |
| 61 | 12 |
| 80 | 14 |
| 100 | 14 |
| 140 | 15 |

EXAMPLE 5

This example shows that various plasticizers for the ethylene/propylene copolymer have a similar influence on the value of adhesion to natural rubber if the copolymer has the required high Mooney viscosity.

An ethylene/propylene copolymer identical with that of Example 1 (Mooney viscosity ML (1+4) at 100°C=60) is extended with all types of plasticizers reported in Table 2, in the ratio of 75 parts of copolymer per 25 parts of oil.

The resulting mixes are made to adhere to mix D based on natural rubber of Example 3 and after molding at 160°C for 50 minutes, the adhesion values are determined by the peeling method.

TABLE 2

Ethylene/Propylene Copolymer (ML(1+4) at 100° C.=60) (75 parts) Plasticized With Various Plasticizers (25 parts)

| Plasticizer type | Peeling at 90° C. (kg./cm.) |
| --- | --- |
| Exaplas PPA (polypropylene adipate) | 10 |
| Butyl stearate | 11 |
| Circosol 2xH (Kynematic viscosity at 210° F.=17cst.) (VGC=0.885) [1] | 11 |
| FL 65 (Engler viscosity at 50° C.=2.2; VGC=0.80) [2] | 14 |

[1] Naphthenic oil of the Sun Oil Co.
[2] Paraffinic oil of the Montecatini Co.

In all cases the extended product shows good values of adhesion to natural rubber, i.e., of about 10-12 kg/cm.

EXAMPLE 6

This example shows the influence of the filler type present in the mix made up of natural rubber, on the adhesion value to Mix E of Example 3.

The mixes made up of natural rubber are those of Type D of Example 3, in which the fillers reported in Table 3 are substituted for the Aerosil.

Molding condition in the press: 160°C for 50 minutes.

TABLE 3.—NATURAL RUBBER LAYER, VARIOUS FILLERS

| Filler substituted for the anhydrous silica in Mix D | (kg./cm.) Peeling at 90° C. |
| --- | --- |
| Aerosil (anhydrous silica) | 16 |
| Hi-Sil (hydrated silica) | 16 |
| Santocel (hydrated silica) | 16 |
| Carbon black HAF | 2.5 |

The best values are therefore obtained with white fillers of the acid type.

EXAMPLE 7

This example shows the influence of the amount of plasticizer of the paraffinic type (mineral oil FL 65) in the ethylene/propylene copolymer on the value of adhesion to Mix D of Example 3.

The mixes based on copolymer are those of the type E reported in Example 3. In the following tables, some tests are reported, carried out with a copolymer at Mooney viscosity at 100°C of 150, 100, 60, 30 and having a propylene content between 45 and 55% by moles.

Molding conditions in the press: 160°C for 15 minutes.

TABLE 4

Ethylene/Propylene Copolymer (ML (1+4) at 100° C.=150), Varying Ratio of Copolymer to Plasticizer (Mineral Oil FL 65)

| Copolymer, parts by weight | Plasticizer, parts by weight | ML(1+4) at 100° C. of plasticized copolymer | Pealing at 90° C. (kg./cm.) |
| --- | --- | --- | --- |
| 100 |  | 150 | 15 |
| 95 | 5 | 130 | 16 |
| 90 | 10 | 112 | 15 |
| 85 | 15 | 93 | 15 |
| 80 | 20 | 78 | 17 |
| 75 | 25 | 63 | 14 |
| 70 | 30 | 52 | 16 |
| 65 | 35 | 41 | 17 |
| 60 | 40 | 32 | 15 |
| 55 | 45 | 23 | 14 |
| 50 | 50 | 15 | 15 |
| 45 | 55 | 12 | 15 |
| 40 | 60 | 8 | 6 |
| 35 | 65 | 5 | 6 |

TABLE 5

Ethylene/Propylene Copolymer (ML (1+4) at 100° C.=100), Varying Ratio of Copolymer to Plasticizer (Mineral Oil FL 65)

| Copolymer, parts by weight | Plasticizer, parts by weight | ML (1+4) at 100° C. of plasticized copolymer | Peeling at 90° C. (kg./cm.) |
| --- | --- | --- | --- |
| 100 |  | 100 | 15 |
| 95 | 5 | 87 | 14 |
| 90 | 10 | 76 | 16 |
| 85 | 15 | 62 | 15 |
| 80 | 20 | 52 | 16 |
| 75 | 25 | 43 | 15 |
| 70 | 30 | 34 | 14 |
| 65 | 35 | 27 | 16 |
| 60 | 40 | 21 | 15 |
| 55 | 45 | 15 | 8 |
| 50 | 50 | 9 | 5 |
| 45 | 55 | 5 | 4 |

TABLE 6

Ethylene/Propylene Copolymer (ML(1+4) at 100° C.=60), Varying Ratio of Copolymer to Plasticizer (Mineral Oil FL 65)

| Copolymer, parts by weight | Plasticiser, parts by weight | ML (1+4) at 100° C. of plasticized copolymer | Peeling at 90° C. (kg./cm.) |
| --- | --- | --- | --- |
| 100 |  | 60 | 15 |
| 95 | 5 | 51 | 14 |
| 90 | 10 | 43 | 15 |
| 85 | 15 | 37 | 16 |
| 80 | 20 | 31 | 15 |
| 75 | 25 | 25 | 14 |
| 70 | 30 | 21 | 10 |
| 65 | 35 | 17 | 8 |
| 60 | 40 | 13 | 4 |
| 55 | 45 | 9 | 3 |
| 50 | 50 | 5 | 2 |

TABLE 7

Ethylene/Propylene Copolymer (ML(1+4)=30), Varying Ratio of Copolymer to Plasticizer (Mineral Oil FL 65)

| Copolymer, parts by weight | Plasticizer, parts by weight | ML(1+4) at 100° C. of plasticized copolymer | Peeling at 90° C. (kg./cm.) |
| --- | --- | --- | --- |
| 100 |  | 30 | 3 |
| 95 | 5 | 25 | 2 |
| 90 | 10 | 21 | 2 |
| 85 | 15 | 17 | 2 |
| 80 | 20 | 14 | 1.2 |
| 75 | 25 | 12 | 1.5 |
| 70 | 30 | 10 | 1.1 |
| 65 | 35 | 7 | 1 |
| 60 | 40 | 5 | 1 |

From the data of these tables it appears that for each Mooney viscosity the copolymer tolerates a given extension with oil up to a limit value above which the adhesion drops quickly. With the copolymer having a Mooney viscosity of 30, the adhesion values are always low.

Thus, referring to Table 4, one would obtain satisfactory bonding according to this invention by using an oil-extended elastomer containing as little as 45 parts per hundred of a copolymer with a Mooney viscosity of 150. The Mooney viscosity of the extended elastomer would thus be 12, and the peeling test result would be the very satisfactory value of 15 kg/cm. Similarly, referring to Table 5, it is to be noted that 60 parts of a 100 Mooney copolymer may be extended with 40 parts oil and produce satisfactory results; and from Table 6, it is seen that 70 parts of a 60 Mooney copolymer may be extended with 30 parts oil, with the satisfactory peeling test value of 10 kg/cm after bonding according to this invention. Thus, starting with an elastomer having a Mooney viscosity of at least 60, one would advantageously add sufficient plasticizer to decrease the Mooney viscosity of the plasticized mix to an easily workable level The maximum amount of plasticizer which may be employed for this purpose without causing the bonding to be unsatisfactory is seen to vary according to the Mooney viscosity of the elastomer employed. In general, the higher the initial Mooney, the lower may be the Mooney after plasticization with oil, while still obtaining satisfactory adhesion value.

EXAMPLE 8

Some types of ethylene/propylene/1,5-cyclooctadiene terpolymer were tested in the adhesion to Mix A made up of natural rubber, as reported in Example 1. The terpolymers used have a different Mooney viscosity and different molar compositions.

The mixes based on terpolymer were vulcanized with either sulfur and accelerators or with sulfur and peroxides.

a) Vulcanization of the terpolymer with sulfur and accelerators.

COMPARATIVE EXAMPLE

These mixes based on terpolymer have the following composition:

Mix G:

| | Parts by weight |
|---|---|
| Ethylene/propylene/1,5-cyclooctadiene terpolymer | 100 |
| ZnO | 1 |
| Carbon black HAF | 50 |
| Stearic acid | 0.15 |
| Phenyl-beta-naphthylamine | 1 |
| Tetramethyl thiuram disulfide | 1 |
| Mercaptobenzothiazyl sulfide | 0.5 |
| Sulfur | 2 |

The specimens were molded in a press at 155°C for 40 minutes.

The results of the peeling tests are reported in Table 8.

TABLE 8

Non-peroxidic Vulcanization of Mix G Containing Unplasticized Ethylene/Propylene/Cyclooctadiene Terpolymer, Varying Mooney Viscosity and Monomer Ratio

| Copolymer Mooney viscosity ML(1+4) at 100° C. | Molar composition | | Peeling at 90° C. (kg./cm.) |
|---|---|---|---|
| | Propylene, percent by moles | Unsaturations (1,5-cyclo-octadiene) | |
| 35 | 50 | 3 | 0 |
| 45 | 57 | 3.5 | 0 |
| 60 | 63 | 2.9 | 0 |
| 100 | 55 | 3.2 | 0.5 |
| 140 | 50 | 3.7 | 4.2 |

As shown by these data, with non-peroxidic vulcanization recipe the adhesion does not reach satisfactory values.

b) Vulcanization of the terpolymer with sulfur and peroxide.

These mixes made up of terpolymer have the following composition:

Mix H:

| | Parts by weight |
|---|---|
| Ethylene/propylene/1,5-cyclooctadiene copolymer | 100 |
| ZnO | 3 |
| Carbon black HAF | 50 |
| Flectol H (antioxidant) | 0.5 |
| Pine tar | 0.5 |
| Sulfur | 0.63 |
| Alpha-alpha'-bis(tert.-butyl-peroxy) diisopropylbenzene (Peroximon) | 1.7 |

The specimens were molded in a press at 165°C for 40 minutes.

The results of the peeling tests are reported in Table 9.

TABLE 9

Sulfur and Peroxide Vulcanization of Mix H Containing the Terpolymers of Table 8

| Terpolymer Mooney viscosity ML(1+4) at 100° C. | Molar composition | | Peeling at 90° C. (kg./cm.) |
|---|---|---|---|
| | Propylene, percent by moles | Unsaturations (cyclooctadiene-1,5) | |
| 35 | 50 | 3 | 4.5 |
| 45 | 57 | 3.5 | 5 |
| 60 | 63 | 2.9 | 10 |
| 100 | 55 | 3.2 | 12 |
| 140 | 50 | 3.7 | 13 |

With the peroxidic vulcanization recipe an adhesion to natural rubber is obtained which also in this case reaches satisfactory values with a Mooney viscosity=60.

EXAMPLE 9

The adhesion of the ethylene/propylene copolymer, vulcanized with peroxide, to natural rubber vulcanized with sulfur and accelerators, both without filler, was determined.

Copolymers having a different Mooney viscosity, namely the types ML=30, 45, 60, 100 and 140 were used.

The mixes made up of copolymer and natural rubber have the following composition:

Mix I:

| | Parts by weight |
|---|---|
| Natural rubber (ML(1+4) at 100° C.=4048/ | 100 |
| 2,2'-methylene-bis-4-methyl-6-tert.-butyl-phenol (Anti oxidant 2246) | 1 |
| ZnO | 3 |
| Diphenylguanidine | 0.5 |
| Santocure | 1.2 |
| Sulfur | 2.5 |

Mix J:

| | Parts by weight |
|---|---|
| Ethylene/propylene copolymer | 100 |
| Sulfur | 0.3 |
| Alpha-alpha'-bis(tert.-butyl-peroxy)diisopropylbenzene (Peroximon) | 1.7 |

The specimens were molded in a press at 165°C for 40 minutes.

In all cases, the adhesion value is null, and this demonstrates that the presence of at least a black or preferably a white mineral filler is required in the mix made up of diene rubber, layer (A), in order to obtain the adhesion.

EXAMPLE 10

Some types of ethylene/propylene/6-methyl-4,7,8,9-tetrahydroindene terpolymer were tested in the adhesion to mix A based on natural rubber reported in Example 1.

The terpolymers used have a different Mooney viscosity and different molar compositions.

The mixes based on terpolymer were vulcanized with either sulfur and accelerators or with sulfur and peroxides.

a) Vulcanization of the terpolymer with sulfur and accelerators (example of comparison).

These mixes based on terpolymer have the following composition:

These mixes based on terpolymer have the following composition:

| | Parts |
|---|---|
| Ethylene/propylene/6-methyl-4,7,8,9-tetrahydroindene terpolymer | 100 |
| ZnO | 1 |
| Carbon black HAF | 50 |
| Stearic acid | 0.15 |
| Phenyl-beta-naphthylamine | 1 |
| Tetramethyl thiuram disulphide | 1 |
| Mercaptobenzothiazyl sulphide | 0.5 |
| Sulfur | 2 |

The specimens were moulded in a press at 155°C for 40 minutes.

The results of the peeling tests are reported in Table 10.

TABLE 10

| Mooney viscosity ML (1+4) at 100° C. of the copolymer | Molar composition | | Peeling, kg./cm. at 90° C. |
|---|---|---|---|
| | Propylene, percent by mols | Unsaturations (6-methyl-4,7,8,9-tetra-hydro-indene) | |
| 35 | 40 | 1 | 0 |
| 45 | 39 | 1.2 | 0 |
| 60 | 42 | 1 | 0 |
| 100 | 40 | 1.1 | 1 |
| 140 | 41 | 1.2 | 4 |

As shown by these data, with non-peroxidic vulcanization recipe the adhesion does not reach satisfactory values.

b) Vulcanization of the terpolymer with sulfur and peroxide. These mixes based on terpolymer have the following composition:

| | Parts |
|---|---|
| Ethylene/propylene/6-methyl-4,7,8,9-tetrahydroindene copolymer | 100 |
| ZnO | 3 |
| Carbon black HAF | 50 |
| Flectol H (antioxidant) | 0.5 |
| Pine Tar | 0.5 |
| Sulfur | 0.63 |
| Peroximon | 1.7 |

The specimens were moulded in a press at 165°C for 40 minutes.

The results of the peeling tests are reported in Table 11.

TABLE 11

| Mooney viscosity ML (1+4) at 100° C. of the terpolymer | Molar composition | | Peeling, kg./cm. at 90° C. |
|---|---|---|---|
| | Propylene, percent by mols | Unsaturations (6-methyl-4,7,8,9-tetrahydro-indene) | |
| 35 | 40 | 1 | 4 |
| 45 | 39 | 1.2 | 5 |
| 60 | 42 | 1 | 11 |
| 100 | 40 | 1.1 | 13 |
| 140 | 41 | 1.2 | 16 |

With the peroxidic vulcanization recipe an adhesion to natural rubber is obtained which also in this case reaches satisfactory values with a Mooney viscosity =60.

As will be apparent, changes in details maybe made in practicing this invention without departing from the spirit thereof.

We claim:

1. In a process for bonding (A) a rubber selected from the group consisting of natural and synthetic diene rubbers with (B) an elastomric material selected from the group consisting of saturated copolymers of ethylene with higher alpha-olefins and low-unsaturation terpolymers of ethylene with higher alpha-olefins and a nonconjugated diene, the improvement which comprises (1) contacting a layer of unvulcanized rubber (A), said layer containing a mineral reinforcing filler and a vulcanization agent comprising sulfur and an accelerator, with a layer of said elastomeric material (B), said layer containing a vulcanization agent of about 1−4.5% by weight organic peroxide, and sulfur said elastomeric material (B) being unvulcanized and having an initial, unextended Mooney viscosity ML (1+4) at 100°C of between 60 and 150 and an ethylene molar content of from about 20 to 80%, and, when said elastomeric material is a terpolymer, the diene is present in such amount that 0.05 to 1 double bond is present per 100 carbon atoms, and (2) heating to a vulcanizing temperature to effect covulcanization of said layers.

2. The method of Claim 1 wherein said layer of elastomeric material (B) further contains a paraffinic oil, the amount of said oil being so selected that upon effecting bonding of said layer (A) to (B) by covulcanization, the adhesion value, as determined by peeling test ASTM D 413/39 at 90°C is at least about 10 kg per cm.

3. The method of Claim 1 wherein said diene rubber layer is a tire carcass and said elastomeric material layer is a tire tread.

4. The method of Claim 1 wherein one side of said diene rubber layer is bonded to a vulcanized tire carcass and the other side of said diene rubber layer is contacted with said elastomeric material layer and the two layers are then vulcanized.

5. A tire produced by the method of Claim 3.

6. A retreaded tire produced by the method of Claim 4.

7. A laminate comprising a layer of a rubber (A) selected from the group consisting of natural and synthetic diene rubbers, said layer containing a mineral reinforcing filler and being bonded directly to a layer of an elastomeric material (B) selected from the group consisting of saturated copolymers of ethylene with higher alpha-olefins and low-unsaturation terpolymers of ethylene with higher alpha-olefins and a nonconjugated diene, said elastomeric material having an initial, unextended Mooney viscosity ML (1+4) at 100°C of between 60 and 150 and an ethylene molar content of from about 20 to 80%, the diene being present in such amount that 0.05 to 1 double bond is present per 100 carbon atoms when said elastomeric material is a terpolymer, said layers of rubber (A) and elastomeric material (B) being covulcanized to one another.